US007957389B2

(12) United States Patent
Hu

(10) Patent No.: US 7,957,389 B2
(45) Date of Patent: Jun. 7, 2011

(54) METHOD OF STALL IDENTIFICATION AND RECOVERY

(75) Inventor: Teck Hu, Budd Lake, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1268 days.

(21) Appl. No.: 10/815,128

(22) Filed: Mar. 31, 2004

(65) Prior Publication Data

US 2005/0220032 A1    Oct. 6, 2005

(51) Int. Cl.
    H04L 12/28        (2006.01)
(52) U.S. Cl. ......................................... 370/394; 370/469
(58) Field of Classification Search .................. 370/252, 370/253, 235, 236, 310, 338, 469, 394
    See application file for complete search history.

(56) References Cited

U.S. PATENT DOCUMENTS

| 6,285,662 | B1 * | 9/2001 | Watanabe et al. | 370/280 |
| 6,693,910 | B2 * | 2/2004 | Chao | 370/394 |
| 7,035,214 | B1 * | 4/2006 | Seddigh et al. | 370/231 |
| 7,187,677 | B2 * | 3/2007 | Torsner et al. | 370/394 |
| 2003/0123403 | A1 * | 7/2003 | Jiang | 370/328 |
| 2003/0128705 | A1 * | 7/2003 | Yi et al. | 370/394 |
| 2003/0169741 | A1 | 9/2003 | Torsner et al. | 370/394 |
| 2004/0062222 | A1 * | 4/2004 | Seidel et al. | 370/335 |
| 2004/0148546 | A1 * | 7/2004 | Meyer et al. | 714/18 |
| 2005/0060518 | A1 * | 3/2005 | Augsburg et al. | 712/214 |

FOREIGN PATENT DOCUMENTS

| EP | 1 313 275 | 5/2003 |
| EP | 1 326 388 | 7/2003 |
| EP | 1 398 897 | 3/2004 |

OTHER PUBLICATIONS

Pending U.S. Appl. No. 10/642,581, filed Aug. 19, 2003, F. Cheng et al (Cheng 8-15-18).
Pending U.S. Appl. No. 10/243,443, filed Sep. 13, 2002, T. Hu et al (Hu 9-5).
Pending U.S. Appl. No. 10/404,187, filed Apr. 1, 2003, F. Cheng et al (Cheng 5-11).

* cited by examiner

Primary Examiner — Huy D Vu
Assistant Examiner — Dady Chery
(74) Attorney, Agent, or Firm — John Ligon

(57) ABSTRACT

A method of wireless communication. The method includes the step of determining a probability of a stalling condition for at least one data packet in a sequence of data packets. The method also includes the step of transmitting a flush command in response to the determined probability of the stalling condition. Prior to the transmitting of a flush command, a wait time may be estimated in response to the probability determined for the stalling condition. This wait time may be estimated by determining an average number of time slots necessary before the first data packet may be transmission. The estimated wait time may depend on the successful transmission of another packet having a lower order (e.g., previous) designation in the sequence of data packets, as well as on the probability determined for the stalling condition (e.g., the probability of a no-stalling condition).

10 Claims, 3 Drawing Sheets

METHOD OF STALL IDENTIFICATION AND RECOVERY

BACKGROUND OF THE INVENTION

I. Field of the Invention

The present invention relates to telecommunications, and more particularly to wireless communications.

II. Description of the Related Art

Wireless communications systems employ a number of geographically distributed, cellular communication sites or base stations. Each base station supports the transmission and reception of communication signals to and from stationary or fixed, wireless communication devices or units. Each base station handles communications over a particular region commonly referred to as a cell/sector. The overall coverage area for a wireless communications system is defined by the union of cells for the deployed base stations. Here, the coverage areas for adjacent or nearby cell sites may overlap one another to ensure, where possible, contiguous communications coverage within the outer boundaries of the system.

When active, a wireless unit receives signals from at least one base station over a forward link or downlink and transmits signals to at least one base station over a reverse link or uplink. There are many different schemes for defining links or channels for a cellular communication system, including, for example, TDMA (time-division multiple access), FDMA (frequency-division multiple access), and CDMA (code-division multiple access) schemes. In CDMA communications, different wireless channels are distinguished by different channelization codes or sequences that are used to encode different information streams, which may then be modulated at one or more different carrier frequencies for simultaneous transmission. A receiver may recover a particular stream from a received signal using the appropriate code or sequence to decode the received signal.

For voice applications, conventional cellular communication systems employ dedicated links between a wireless unit and a base station. Voice communications are delay-intolerant by nature. Consequently, wireless units in wireless cellular communication systems transmit and receive signals over one or more dedicated links. Here, each active wireless unit generally requires the assignment of a dedicated link on the downlink, as well as a dedicated link on the uplink.

With the explosion of the Internet and the increasing demand for data, resource management has become a growing issue in cellular communication systems. Next generation wireless communication systems are expected to provide high rate packet data services in support of Internet access and multimedia communication. Unlike voice, however, data communications may be relatively delay tolerant and potentially bursty in nature. Data communications, as such, may not require dedicated links on the downlink or the uplink, but rather enable one or more channels to be shared by a number of wireless units. By this arrangement, each of the wireless units on the uplink competes for available resources. Resources to be managed in the uplink include the received power at the base station, and the interference created by each user to other users in the same sector or cell, as well as in other sectors or cells, for example. This is in contrast to the resources to be managed on the downlink, including fixed transmit power budgets.

While data communications may be relatively delay tolerant and potentially bursty in nature, one problem expected in the next generation wireless communication systems is failed data block or data packet transmission. More particularly, a base station, for example, may unsuccessfully transmit one or more data packets from a number of packets to an identified wireless unit. As a result of this failure, the base station may use any number of retransmission techniques, such as hybrid automatic repeat request ("HARQ"), for example, to deliver the data packet(s) not satisfactorily received by the wireless unit. While the base station attempts retransmission of previously unsuccessful transmitted packets, other data packets may be, however, subsequently transmitted to the wireless unit.

In High Speed Downlink Packet Access ("HSDPA") systems, each wireless unit employs a timer set by the base station. Packet data is sent from the base station to the wireless unit in a sequential manner. Upon satisfactory reception, the wireless unit delivers the packet data from its buffer for processing in the same sequential order. If, during reception, the wireless unit determines that a gap in the sequence order of the received data packets has occurred, the wireless unit then starts a timer for the missing data packet(s). The timer provides a time window in which the wireless unit waits for the satisfactory reception of each data packet, perceived as missing, by transmission and/or a retransmission scheme(s). If the retransmission scheme fails to satisfactorily deliver the missing data packet(s) to the wireless unit before the timer window passes, the wireless unit assumes the packet(s) to be lost.

Data packets may be lost for various reasons. In one scenario, the base station may determine that the maximum retransmission attempts for a data packet have been exceeded and no further retransmission are permissible. Secondly, the base station may decide to unilaterally abort the transmission or retransmission of the data packet(s). Thirdly, the base station may determine that its resources are needed for a higher priority customer(s) or higher priority data, and therefore may terminate the transmission and/or retransmission of the "missing" data packet. Fourthly, the wireless unit may receive the transmitted data packet with an error. Here, the wireless unit transmits a NACK (e.g., a negative acknowledgment to indicate reception of a data packet with errors), though the base station mistakenly receives an ACK (e.g., a positive acknowledgment indicating the wireless unit received the data packet satisfactorily) instead and, thusly, no retransmission will occur in the base station.

Consequently, in HSDPA systems, the base station may determine the missing one or more data packets as lost at any point of the transmission and/or retransmission. In contrast, however, the wireless unit will not ascertain the missing data packet(s) as lost until after the timer expires. Consequently, the wireless unit has to wait until the timer expires before processing the received data packets, and/or attempting to recover the lost packet(s) by various other techniques. This delay or waiting time for the timer to expire is sometimes referred to as a stall period.

The length of the stall period may be relatively substantial in time. The base station may determine the missing packet as lost by, for example, aborting its retransmission or determining to serve higher priority customer(s) or higher priority data, in significantly less time than the setting of the timer by the base station. It should be noted that the timer is initially set conservatively such that the wireless unit may handle a predetermined number of retransmission attempts for missing data packets. Due to the randomness of the completion time of each transmission, the time to complete a designated number of retransmission attempts may vary. Consequently, the timer is set conservatively so that valid transmissions may not be terminated prematurely.

As a result of the hereinabove, a demand exists for a method supportive of efficient, high-speed data communications that avoids or minimizes unnecessary delays. Moreover, a need exists for a method of minimizing the effects of a stalling condition period in wireless units.

SUMMARY OF THE INVENTION

The present invention provides a method for data communication that minimizes the effects of a stalling condition in telecommunications networks. More particularly, the present invention provides a method of determining the probability that one of a number of sequential data packets may stall due to out-of-order reception. With the probability of a stalling condition determined, the present invention may transmit a flush command to alleviate the effects of the stalling condition. For the purposes of the present invention, a flush command may correspond with a base station (e.g., Node B) for detecting whether a data packet has stalled, and for detecting whether the stalled data packet may be designated for a particular memory location (e.g., one end of a finite buffer) at the wireless unit.

In an embodiment of the present invention, a probability of a stalling condition is determined for at least one data packet in a sequence of data packets. The method also includes the step of transmitting a flush command in response to the determined probability of the stalling condition. Prior to the transmitting of a flush command, a wait time may be estimated in response to the probability determined for the stalling condition. The wait time may be estimated by determining an average number of time slots necessary before one data packet may be transmitted. The estimated wait time may depend on the successful transmission of another packet having a lower order (e.g., previous) designation in the sequence of data packets, as well as on the probability determined for the stalling condition (e.g., the probability of a no-stalling condition).

This and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides a method for data communication that minimizes the effects of a stalling condition in telecommunications networks. More particularly, the present invention provides a method of determining the probability that one of a number of sequential data packets may stall due to out-of-order reception. With the probability determined, the present invention may attempt to alleviate the effects of the stalling condition.

Figure 1:
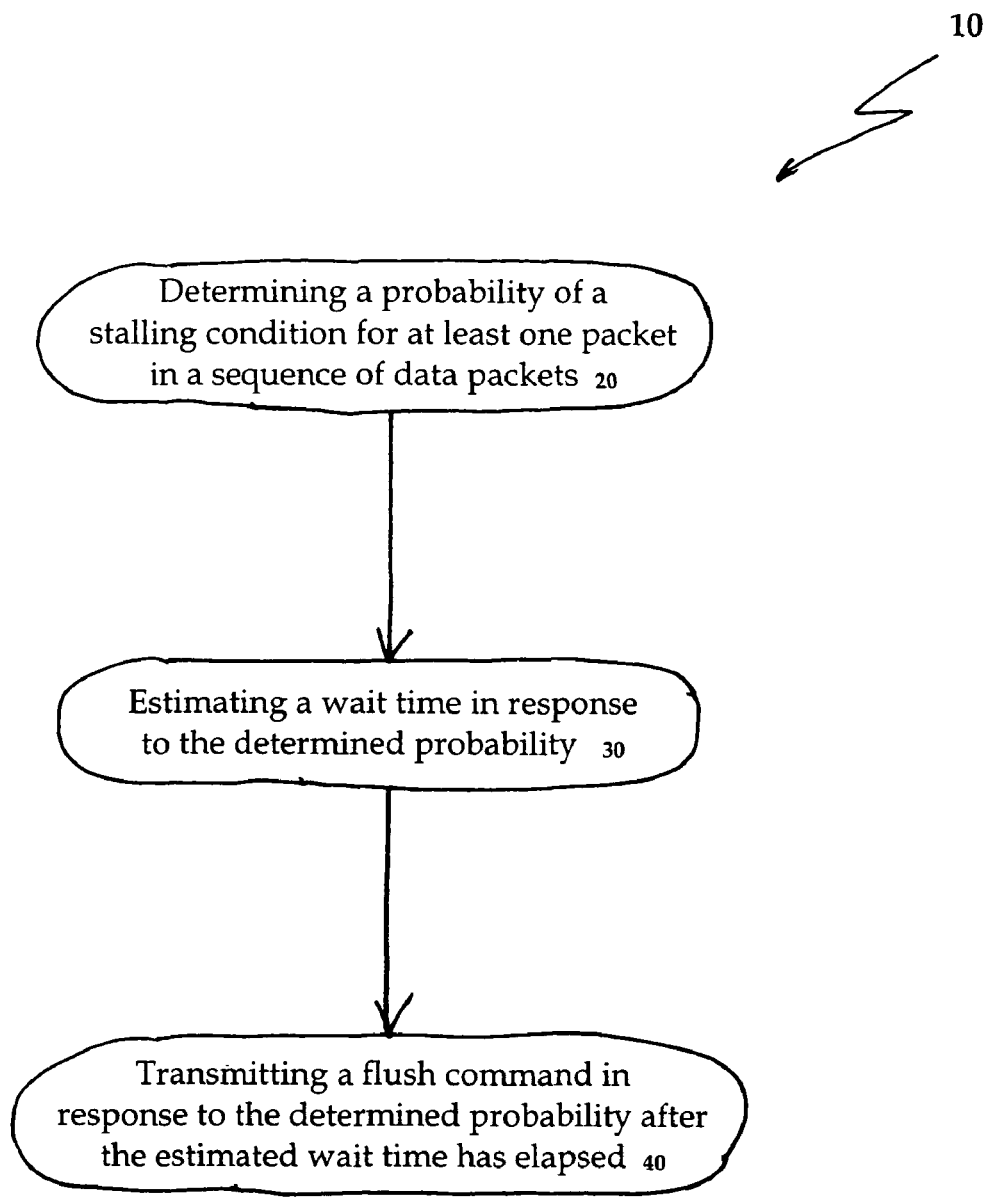
FIG. 1 depicts a flow chart of an embodiment of the present invention.

Referring to FIG. 1, a flow chart depicting an embodiment of the present invention is illustrated. More particularly, an algorithmic method (10) is shown for minimizing the effects of a stalling condition in telecommunications networks. It should be noted that the stalling condition might arise, in one example of the present invention, where packets are transmitted in support of High Speed Downlink Packet Access ("HSDPA") and/or High Speed Uplink Packet Access ("HSUPA"). These packets may, thusly, have a specifically designated sequence or order.

The algorithmic method (10) of FIG. 1 may initially include the step of determining a probability of a stalling condition for at least one packet from a sequence of data packets (step 20). The probability of a stalling condition may be determined in response to one or more system parameters. This system parameter(s) may be available, ascertainable and/or calculate-able at the base station (e.g., Node B). The one or more system parameters may include a size of the sequence of data packets, a number of repeat request processes, at least one priority for each of the number of repeat request processes, a probability of error over an uplink (e.g., uplink acknowledgement error) and a probability of error over a downlink (e.g., downlink packet transmission error), for example.

Once the probability of a stalling condition for at least one packet is determined, the algorithmic method (10) of FIG. 1 may thereafter include the step of estimating a wait time prior to attempting to alleviate the effects of the stalling condition (step 30). The step of estimating a wait time may be executed in response to determining the probability of the stalling condition. More particularly, the step of estimating a wait time may include determining a number of time slots that one data packet (e.g., the most recent data packet) from the sequence of data packets may experience prior to transmission (e.g., prior to the transmission of the most recent data packet). In one example, the number of time slots may be an average.

It should be noted that determining the number of time slots might be realized by several steps. Here, the most recent data packet may be first cued for transmission. Thereafter, a determination should be made as to whether another data packet, having a lower order sequential designation than the most recent data packet, previously transmitted but not yet received, may be stalled. From these steps, the significance of the estimated wait time for the most recent data packet may be derived.

Subsequently, the algorithmic method (10) of FIG. 1 may thereafter include the step of transmitting a flush command to alleviate the effects of the stalling condition (step 40). The transmission of the flush command may be executed in response to the determined probability. For the purposes of the present invention, a flush command may correspond with a base station (e.g., Node B) for detecting whether a data packet has stalled, and for detecting whether the stalled data packet may be designated for a particular memory location (e.g., one end of a finite buffer) at the wireless unit.

In one embodiment of the present invention, the step of transmitting a flush command may be realized by transmitting the aforementioned most recent data packet in response to determining that the another data packet, having a lower order sequential designation than the most recent data packet, previously transmitted has stalled. Here, the receiver may receive the most recent data packet. A determination may then be made at either the receiver and/or transmitter as to whether stalled data packet was designated for a particularly memory location. In one example, the particular memory location is at one end (e.g., the top or bottom) of a finite memory buffer. If stalled data packet was designated for bottom of the buffer, for example, the transmitter may execute a flush command such that the most recent data packet forces the data packet in the adjacent memory location to fill the gap in the buffer.

Figure 2:
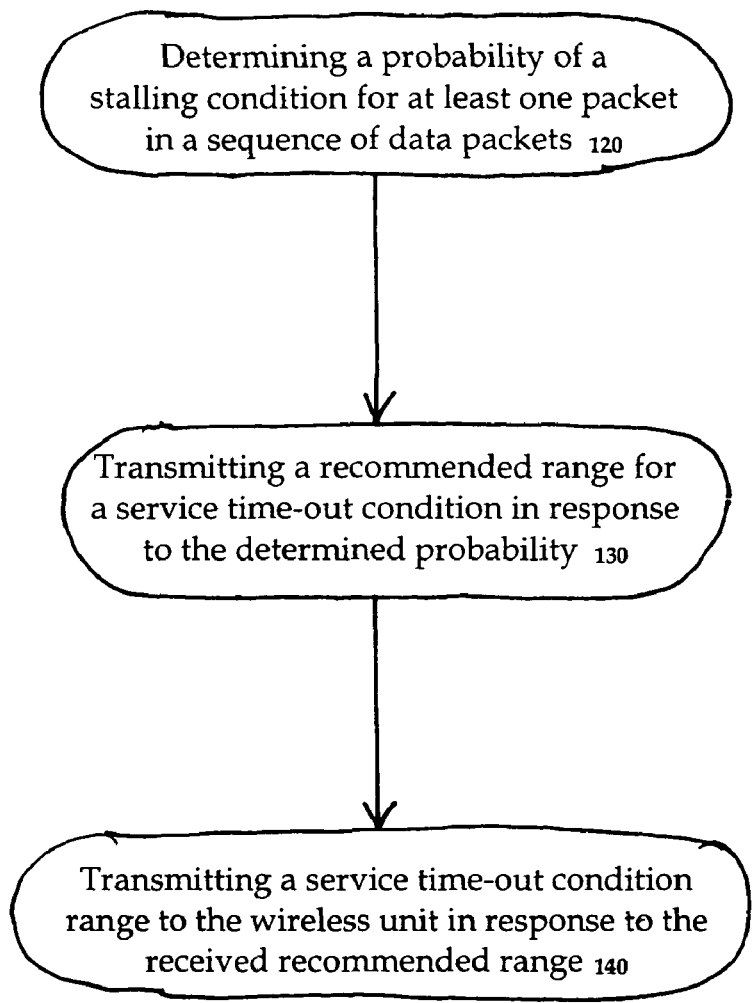
FIG. 2 depicts a flow chart of another embodiment of the present invention.

Referring to FIG. 2, a flow chart depicting another embodiment of the present invention is illustrated. More particularly, an algorithmic method (100) is shown for addressing a stalling condition between infrastructure elements in a telecommunications network, such as a base station (e.g., Node B) and a base station controller (e.g., radio network controller), for example. It should be noted that the stalling condition might arise, in one example of the present invention, where packets are transmitted in support of a service such as High Speed Downlink Packet Access ("HSDPA") and/or High Speed Uplink Packet Access ("HSUPA"). These packets may, thusly, have a specifically designated sequence or order.

The algorithmic method (100) of FIG. 2 includes the step of determining a probability of a stalling condition for at least one packet from a sequence of data packets (step 120). In one example, the step of determining the probability of a stalling condition may be performed at the base station (e.g., Node B) in response to one or more system parameters. These system parameter(s) may be available, ascertainable and/or calculate-able at the base station (e.g., Node B). The one or more system parameters may include a size of the sequence of data packets, a number of repeat request processes, at least one priority for each of the number of repeat request processes, a probability of error over an uplink and a probability of error over a downlink, for example.

Once the probability of a stalling condition for at least one packet is determined, the algorithmic method (100) of FIG. 2 may calculate and transmit a recommended range for a service time-out condition in response to the determined probability (step 130). The service time-out condition may be performed by the base station (e.g., Node B) and subsequently transmitted to the base station controller (e.g., radio network controller). The recommended service time-out condition may correspond to a suggested timer range to minimize a stall condition, while maintaining network efficiency.

More particularly, the timer, as selected from the suggested timer range, may be initiated should, for example, a data packet be deemed missing. Once the timer expires, the missing data packet that triggered a stall condition is then deemed lost. It should be noted that once the timer expires, the wireless unit communicates with the upper layer that the packet is lost. Consequently, the upper layer may attempt to recover this lost packet.

Thereafter, the base station controller (e.g., radio network controller) may receive the recommended range for a service time-out condition from the base station (e.g., Node B). During a call set-up, for example, a service time-out condition range may be transmitted by the base station controller (e.g., radio network controller) to the wireless unit. The wireless unit then selects an optimum service time-out condition to maximize its own performance. Therefore, the algorithmic method (100) of FIG. 2 may also include the step of transmitting a service time-out condition range, as determined by the base station controller during a call set-up, to the wireless unit (step 140).

Exemplary Embodiment

In Universal Mobile Telecom Service ("UMTS"), for example, data integrity for High Speed Downlink Packet Access ("HSDPA") and High Speed Uplink Packet Access ("HSUPA") functionality may be maintained via an asynchronous-downlink synchronous-uplink N-channel Hybrid automatic-repeat-request ("ARQ") scheme. Using this type of ARQ method, the receiver may accept packets out of their originally intended sequence. In order to insure that packets are forwarded to higher layers in their proper order, a reordering buffer exists within the receiver protocol. The behavior of the reordering buffer across a wide range of system parameter values via simulation may be, therefore, relevant to addressing a stalling condition. An analytical model of the receiver re-ordering buffer may be employed by deriving the probability of stalling and the expected waiting time to remove a stall. In this regard, the transmitter may decide if and when to remove a stall at the receiver in the event of a dead phase.

As in traditional ARQ schemes, each data packet may be assigned a sequence number in increasing order. Packet delivery may also be insured with the addition of error detecting codes to the information bits and requiring that packets be either positively (e.g., ACK) or negatively (e.g., NACK) acknowledged. For NACKs, the packet should be retransmitted. If no feedback message is received within a pre-defined interval, the transmitter may interpret this as a NACK such that the packet may also be retransmitted—hence the synchronous uplink.

In UMTS, for example, HSDPA functionality may be introduced to increase the maximum rate and throughput of the downlink performance. One area of enhancement is improving the responsiveness to quickly adapt to the condition of the channel. Thus, the addition of a medium access control ("MAC") entity, sometimes labeled MAC-hs, may be implemented in a base station (e.g., Node B) as part of the MAC sub-layer. One ARQ technique may be supported through N ARQ state machines or processes in the MAC-hs entity in the base station. With one ARQ process controlling the ARQ operation over one channel, there may be N ARQ processes for the N channels. For each wireless unit, a new transmission sequence number ("TSN") may be appended to each transmission in the N channels. Up to a maximum of eight simultaneous channels or processes may exist for a single wireless unit. These processes may be divided into sub-groups according to different priority classes of traffic and the TSNs may be unique to each priority class.

Under this scheme, data packets may arrive at the receiver out of their original order. As different HARQ techniques may each require a different number of retransmissions, the retransmissions process may be received successfully in random time. Since data packets should be delivered to higher layers in their original order, a packet may not be delivered to a higher layer if a data packet with a lower sequence number has not yet been received. The effects of the out-of-sequence packets on the higher layer may depend on the operating mode configured for a particular service.

Figures 3, 4:
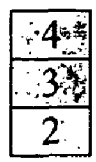
FIG. 3 depicts an aspect of the present invention.
FIG. 4 depicts another aspect of the present invention.

If a packet may not be delivered to higher layers due to a missing lower numbered packet, the missing packet may be deemed stalled. Referring to FIG. 3, an example of stalling is illustrated at the receiver. Here, the re-ordering buffer at the receiver is shown. Here, packets #1, #2, #3, #4 have been sent, but packet #2 has not yet been correctly received at the receiver. Packet #1 is delivered to the higher layer, but there is a stall or "gap" in the re-ordering buffer, preventing the delivery of packets #3 and #4 to the higher layer.

Two basic stall avoidance mechanisms may be employed for removing gaps in the re-ordering buffer due to out-of-sequence delivery. The first stall avoidance approach utilizes a timer mechanism. Here, the timer may be started if a packet may not be delivered to higher layers due to the non-arrival of a packet with a lower sequence number. Upon the expiration of the timer, the gap may be flushed and the recovery of the lost packet should be accomplished via a higher radio link control ("RLC") layer. This methodology, however, introduces greater latency.

The second stall avoidance may be a window-based mechanism. Here, the transmitter may operate under a set of rules derived from the modular nature of the packet sequence numbers to remove stalling in the receiver re-ordering buffer. The window size defines the range of expected sequence numbers at the receiver, and in order to avoid ambiguity, the window size may not be larger than half the TSN space. For example, if the TSN is allotted 3 bits, a sequence number range may be 0, 1, 2, . . . , 7. The transmitter can only transmit packets within a TSN window of 4 packets (or less). If TSNs #1, #2 and #3 are received and #0 is not received, the transmitter may either re-transmit #0 or transmit a new packet #4. Transmitting #4, however advances the window and may communicate to the receiver that #0 will not be re-transmitted. This may end the stall caused by packet #0 on the higher numbered packets that may not be delivered to the higher layer.

It should be noted that for UMTS, the window size might define the maximum range of acceptable packet numbers at the receiver. Such a maximum range does not exist for the window size-based technique. For example, if the UMTS window size is 3, initially TSNs {0,1,2} may be sent. If, however, #1 and #2 are received while #0 is not received, either #0 may be re-transmitted or #3 nay be sent. If #0 is sent, only the combination {0} may be allowed, while if #3 is sent the window is advanced and the allowed combination becomes {3,4,5}. For the window size-based scheme, {0,4,5} may be allowed, where the range of the packet numbers may be greater than 3. The range of expected sequence numbers may be allowed to increase. On the other hand, the window size definition may be the number of packets sent before either a retransmission or the transmission of a new packet. The window size-based technique may send new packets each window as long as at least one packet in the previous window may be received successfully, in contrast with other UMTS schemes, a new window may only send a new packet if the window has been advanced.

Moreover, under one UMTS N-channel scheme, each process may not be tied to a particular time slot. Here, each process may lose its turn due to pre-emption by higher priority class traffic or users with more favorable radio conditions. Indeed, the transmitter may send nothing to a user or particular priority class within a user for several time slots due to the existence of different priority classes and pre-emption due to other users or internal priority classes.

The window size-based technique described previously assumes an infinite sequence number space, whilst one UMTS approach may define a modular scheme based on the number of bits allotted to the TSN. As a direct result, this one UMTS approach should operate under the aforementioned window mechanism.

Referring to FIG. 4, a transmission process is illustrated. It is assumed for the sake of simplicity that the number of HARQ processes may be equal to the half the TSN space. In addition, the error in the feedback channel from NACK to ACK is also not being considered. For the purposes of the foregoing teaching, the following points should be noted. Firstly, the backward/forward phase notation from a multiple receiver case by setting M=1. Moreover, the forward phase ("F") may be defined as the sequence of consecutive slots on a column until the packet may be correctly received, while the backward phase ("B") may be defined as the sequence of slots on a column following reception, until the associated ACK may be received at the transmitter. It should also be noted that an underlined F identifies a new packet transition(s) that may occur without a backward phase—e.g., the ACK may be received on the first attempt. The packet sequence numbers may be assist in further illustrating the transmission process. It should also be assumed that three (3) bits may be employed for the TSN, where a sequence number space may correspond with 0, 1, 2, . . . , 7, four (4) retransmission processes are employed, and no NACK→ACK errors, as detailed herein. Another assumption taken is that a modular window should have a size of half the sequence number space—e.g., 4.

At the first frame/cycle, packets #0, #1, #2, and #3 may be sent by processes A, B, C, and D, respectively. Only #0 may be successful. The corresponding ACK, however, may also be initially successful.

At the second frame, packets #4, #1, #2, and #3 may be transmitted by processes A, B, C, and D, respectively. The modular window may be advanced due to the successful reception of packet #0 during the first frame. Packet #2 may be the only unsuccessful packet. As illustrated, process A keeps transmitting packet #2 to illustrate the fact that the ACK is not correctly received, and may thus eventually causes a stall in the receiver.

At the third frame, packets #4, #5, #2, and #3 may be sent by processes A, B, C, and D, respectively. The modular window may be advanced due to the successful reception of packet #1 during the second frame. Once again, packet #2 is unsuccessful. Process A may be retransmitting #4 since no ACK was received during the previous frame. Process D, on the other hand, may be unable to transmit a new packet since the next packet number, #6, is outside of the current window. This circumstance may be referred to as a stall phase. To be sure, the transmitter may decide to advance the window and hence flush the reordering buffer, thereby avoiding a dead phase. In so doing, however, increased latency may be introduced due to packet recovery at higher layers.

At frame 4, due to the failure of packet #2 during the previous frame, and hence the failure to advance the window, processes A, B, and D may experience a stall phase. However, packet #2 is now successful, advancing the window, and allowing four new packets to be sent at frame 5. The stall phase increases the time between packet renewals for each process. Moreover, the transmission processes (columns) may no longer be independent. Specifically, the failure of a transmission in one process during one frame may prevent the transmission of new packets in all other processes at the next frame.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of communication in a wireless system, the wireless system providing at least one communications path between a transmission node and a receiving node, the method comprising:
   determining at a transmitter at the transmission node a probability of a stalling condition occurring at a receiver at the receiving node for at least one data packet in a sequence of data packets transmitted from the transmission node, the stalling condition probability being determined in relation to a state of at least one system parameter for the wireless system, the system parameter state being determinable at the transmitter; and
   transmitting a flush command to the receiver based on the determined probability of the stalling condition, the flush command being operative to terminate the stalling condition.

2. The method of claim 1, wherein the at least one wireless system parameter comprises a size of the sequence of data packets, a number of repeat request processes, at least one priority for each of the number of repeat request processes, a probability of error over an uplink and a probability of error over a downlink.

3. The method of claim 1, comprising:
   estimating a wait time, prior to the transmitting of a flush command, as a function of the determined probability of the stalling condition.

4. The method of claim 3, wherein the step of estimating a wait time comprises:
   determining an average number of time slots for at least a first data packet prior to transmission.

5. The method of claim 4, wherein the step of determining an average number of waiting time slots comprises:
   queuing at least the first data packet for transmission; and
   determining if a second data packet having a lower sequential designation than the first data packet has stalled.

6. The method of claim 5, wherein the step of transmitting a flush command comprises:
   transmitting the first data packet in response to determining the second data packet has stalled.

7. The method of claim 6, wherein the step of transmitting the first data packet comprises:
   determining if the second data packet is designated for a particular memory location.

8. The method of claim 7, wherein the particular memory location is at one end of a finite buffer.

9. The method of claim 1, comprising:
   transmitting a recommended range for a service time-out condition in response to the determined probability of a stalling condition.

10. The method of claim 9, wherein the service time-out condition corresponds with at least one of a high-speed downlink packet access service and a high-speed uplink packet access service.

* * * * *